(12) United States Patent
Kim et al.

(10) Patent No.: US 11,698,999 B2
(45) Date of Patent: Jul. 11, 2023

(54) CASTING SYSTEM DESIGN METHOD AND SYSTEM THEREFOR

(71) Applicant: ANYCASTING SOFTWARE CO., LTD., Seoul (KR)

(72) Inventors: Sungbin Kim, Seoul (KR); Donghoon Roh, Incheon (KR)

(73) Assignee: ANYCASTING SOFTWARE CO., LTD., Seoul (KR)

( * ) Notice: Subject to any disclaimer, the term of this patent is extended or adjusted under 35 U.S.C. 154(b) by 0 days.

(21) Appl. No.: 17/606,049

(22) PCT Filed: Aug. 22, 2019

(86) PCT No.: PCT/KR2019/010722
§ 371 (c)(1),
(2) Date: Oct. 25, 2021

(87) PCT Pub. No.: WO2020/218682
PCT Pub. Date: Oct. 29, 2020

(65) Prior Publication Data
US 2022/0366093 A1 Nov. 17, 2022

(30) Foreign Application Priority Data
Apr. 24, 2019 (KR) .................. 10-2019-0047697

(51) Int. Cl.
*G06F 30/12* (2020.01)
*G06F 30/20* (2020.01)
(Continued)

(52) U.S. Cl.
CPC ............. *G06F 30/12* (2020.01); *G06F 30/17* (2020.01); *G06F 30/20* (2020.01);
(Continued)

(58) Field of Classification Search
CPC .......... G06F 30/00; G06F 30/12; G06F 30/20; G06F 30/17; G06F 2119/18;
(Continued)

(56) References Cited

U.S. PATENT DOCUMENTS 7,761,263 B2   7/2010  Wang
2012/0078591 A1  3/2012  Sims, Jr.

FOREIGN PATENT DOCUMENTS

JP   2004-066282 A   3/2004
KR   10-0645569 B1  11/2006
(Continued)

OTHER PUBLICATIONS

Hodbe, G.A. et al., "Design and Simulation of LM 25 Sand Casting for Defect Minimization", 2018, Materials Today: Proceedings 5, Elsevier Ltd. (Year: 2018).*

(Continued)

*Primary Examiner* — Cedric Johnson
(74) *Attorney, Agent, or Firm* — Park, Kim & Suh, LLC

(57) ABSTRACT

A casting system design method is disclosed. The casting system design method comprises the steps of: receiving an input of entities associated with the shape of a cast product; generating respective entities for the constituent elements of a casting system on the basis of the inputted shape-related entities and pre-stored knowledge-based basic design information; generating a 3D graphic shape of a casting system designed on the basis of the generated entities; and editing the design of the casting system according to editing commands inputted on a graphics user interface (GUI) on which a 2D graphic shape corresponding to the generated 3D graphic shape is displayed, and dynamically modifying and displaying the 2D graphic shape so as to correspond to the editing.

4 Claims, 15 Drawing Sheets

(51) Int. Cl.
*G06F 30/17* (2020.01)
*G06F 119/18* (2020.01)
*G06F 113/22* (2020.01)
*G06F 119/02* (2020.01)

(52) U.S. Cl.
CPC ...... *G06F 2113/22* (2020.01); *G06F 2119/02* (2020.01); *G06F 2119/18* (2020.01)

(58) Field of Classification Search
CPC .. G06F 2113/22; G06F 2119/02; G06T 15/00; G06T 2219/00; Y02P 90/30
USPC .......................................................... 703/1
See application file for complete search history.

(56) References Cited

FOREIGN PATENT DOCUMENTS

| KR | 10-0877510 B1 | 1/2009 |
| KR | 10-2009-0072465 A | 7/2009 |
| KR | 10-2013-0024649 A | 3/2013 |
| KR | 20130024649 A * | 3/2013 |
| KR | 10-1352916 B1 | 2/2014 |
| KR | 10-1401420 B1 | 5/2014 |
| KR | 10-2015-0110188 A | 10/2015 |
| KR | 10-1846983 B1 | 4/2018 |
| KR | 10-2018-0105093 A | 9/2018 |

OTHER PUBLICATIONS

Sorate, Shubham Sanjay et al., "Effective Use of Casting Simulation for Improving Bearing Housing Casting's Yield", 2017, IJSRET vol. 3, Issue 2. (Year: 2017).*
Siva, T., "An Evaluation of Cylindrical Riser Design with Insulating Material for Aluminum Allow Casting", Jun. 2015, Journal of Applied Engineering (JOAE) 3(6), vol. 3, Issue 6, Scientific Digest. (Year: 2015).*
Ravi, Dr. B. et al, "Computer-Aided Casting Design—Past, Present and Future", Aug. 17, 2014, Research Gate. (Year: 2014).*
Zun, Zhizhong, "Numerical Optimization of Gating Systems for Light Metals Sand Castings", 2007, University of Windsor. (Year: 2007).*
Choudhari, C.M. et al, "Methoding and Simulation of LM 6 Sand Casting for Defect Minimization with its Experimental Validation", 2014, Procedia Engineering 97, The Authors, Elsevier Ltd. (Year: 2014).*
International Search Report in International Application No. PCT/KR2019/010722, dated Jan. 22, 2020, 2pages.

* cited by examiner (a)

(b)

(a)          (b)

(a)

(b)

(a)

(b)

(a)

(b)

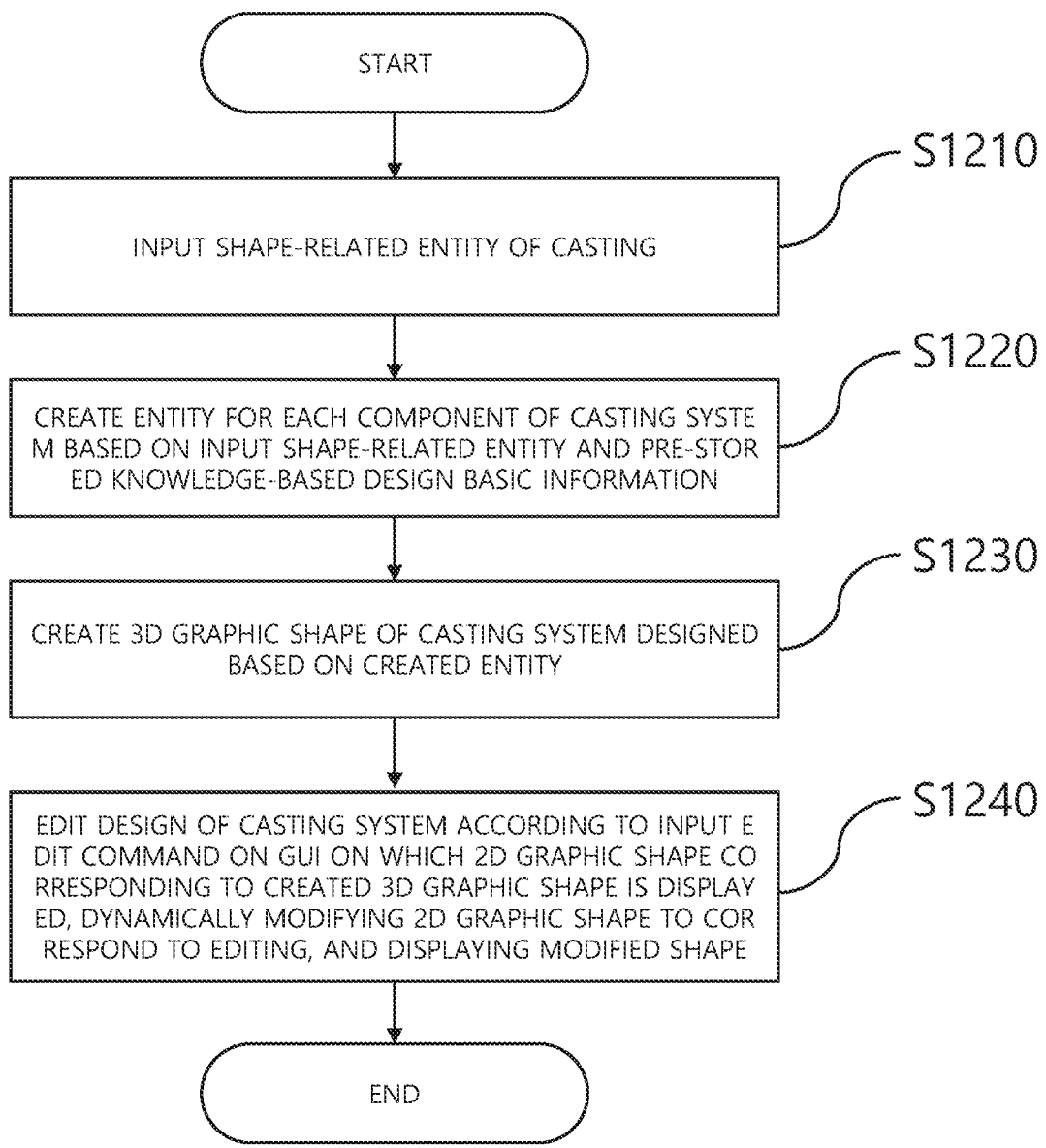

CASTING SYSTEM DESIGN METHOD AND SYSTEM THEREFOR

CROSS-REFERENCE TO RELATED APPLICATIONS

This application is a National Phase Application of PCT International Application No. PCT/KR2019/010722, which was filed on Aug. 22, 2019, and which claims priority from Korean Patent Application No. 10-2019-0047697 filed on Apr. 24, 2019. The disclosures of the above patent applications are incorporated herein by reference in their entirety.

FIELD OF INVENTION

The present disclosure relates to a system for designing a casting system and a system therefor, and more particularly to a system for designing a casting system and a system therefor for designing an optimized casting system using a modeling tool.

BACKGROUND OF INVENTION

Casting refers to a procedure of manufacturing a desired casting by dissolving solid metal with high deformation resistance to form liquid metal with low deformation resistance, injecting the liquid metal into a mold having a target shape, and solidifying the result. In general, quality of a casting is largely dependent upon a method of designing a casting system.

In detail, in the casting process, it is necessary to design to minimize a factor that degrades the quality of the casting, such as gas mixing and metal shrinkage during solidification, and this design is related to a modeling scheme of the casting system in consideration of how molten metal flows into the mold and solidifies.

Conventionally, although engineers design a casting system using CAD, the design of the casting system mainly relies on experience of the engineer, and thus there is a problem in that it is not easy to design an optimized casting system depending on various shapes of molds.

As a patent to overcome the problem, Korean Patent No. 10-0645569 discloses "Optimal Casting System Setting Device and Method", Korean Patent No. 10-0877510 discloses "3D Mold Automatic Design System and Method using CAD Program", and U.S. Pat. No. 7,761,263 discloses "Casting Design Optimization System (CDOS) for Shape Castings".

However, in all of the above cited references, the casting system is designed by storing shapes themselves in a database, searching for a similar shape thereamong, and changing the shape through repetitive simulations, and in this case, there is a problem in that it takes a long time to perform such repetitive simulations.

Accordingly, in order to overcome the above problem, the present applicant discloses "Knowledge-based casting system Model Automatic Creation System" in Korean Patent No. 10-1352916, "Knowledge-based casting system Model Automatic Creation System" in Korean Patent No. 10-1401420, and "Casting System Model Automatic Creation System and Casting System Automatic Creation Method" in Korean Patent No. 10-1846983.

The present disclosure is a modification of the above casting system model automatic creation system by introducing a concept of a riser for removing shrinkage defects due to a difference in internal volume to allow a user to edit the casting system more conveniently.

For example, a casting has a part with a relatively large internal volume (thickness of the casting) and a part with a small internal volume depending on the shape of the mold, and a large amount of molten metal flows into the part with a large internal volume, and thus a solidification rate of the molten metal is inevitably slow compared to the part with a small internal volume. Accordingly, problems such as shrinkage defects are likely to occur in the part with a large internal volume, and thus when the difference in internal volume depending on parts of the mold is not properly compensated for, a defect rate of the casting increases.

In addition, in order to optimize injection of molten metal, the height of the ingate, which is an inlet through which the molten metal flows into a mold, may be different for each ingate, and conventionally, there is no modeling scheme for conveniently applying this height difference, and accordingly, there is an inconvenience in a design of the casting system.

SUMMARY OF INVENTION

Technical Problem to be Solved

To overcome the above problems, the present disclosure may provide a system for designing a casting system and a system thereof for designing a casting system by compensating for defects due to a difference in a solidification speed of molten metal in a mold and conveniently applying a height difference of ingates.

Technical Solution

To achieve the above objects, according to an embodiment of the present disclosure, a method of designing a casting system includes receiving a shape-related entity of a casting, creating an entity for each component of the casting system based on the received shape-related entity and pre-stored knowledge-based design basic information, creating a 3D graphic shape of the casting system designed based on the created entity, and editing a design of the casting system according to the received edit command on a graphic user interface (GUI) on which a 2D graphic shape corresponding to the created 3D graphic shape is displayed, dynamically modifying the 2D graphic shape to correspond to the editing, and displaying the modified 2D graphic shape.

Here, the creating the entity for each component may include creating an entity for a first part including a pouring path, a path-line, an ingate, a joint, and a branch of the casting system, and an entity for a second part including a riser or a vent.

The creating the entity for each component may include determining a position of the riser based on a thickness of the casting and applying the determined position of the riser to an entity of the riser.

The displaying may include automatically adjusting a height of the ingate in a shape of a flow path and editing the design of the casting system depending on a position of an ingate, changed according to the edit command.

The method may further include performing simulation for checking soundness of the designed casting system depending on injection of molten metal according to a user command.

According to an embodiment of the present disclosure, a design system of a casting system includes a database configured to store knowledge-based design basic information, an entity input module configured to receive a shape-related entity of a casting, an entity creation module configured to create an entity for each component of the casting system based on the received shape-related entity and knowledge-based design basic information pre-stored in the database, a 3D shape creation module configured to create a 3D graphic shape of the casting system designed based on the created entity, and a graphic user interface (GUI) module configured to edit a design of the casting system according to the received edit command on a graphic user interface (GUI) on which a 2D graphic shape corresponding to the created 3D graphic shape is displayed, to dynamically modify the 2D graphic shape to correspond to the editing, and to display the modified 2D graphic shape.

Here, the entity creation module may create an entity for a first part including a pouring path, a path-line, an ingate, a joint, and a branch of the casting system, and an entity for a second part including a riser or a vent.

The entity creation module may determine a position of the riser based on a thickness of the casting and may apply the determined position of the riser to an entity of the riser.

The GUI module may automatically adjust a height of the ingate in a shape of a flow path and may edit the design of the casting system depending on a position of an ingate, which is changed according to the edit command.

The design system may further include a simulation module configured to perform simulation for checking soundness of the designed casting system depending on injection of molten metal according to a user command.

Effect of Invention

According to the aforementioned various embodiments of the present disclosure, a user may intuitively and easily make and edit an optimal casting system.

BRIEF DESCRIPTION OF DRAWINGS

FIG. 15 is a flowchart for explaining a method of designing a casting system according to an embodiment of the present disclosure.

BEST MODE

Reference will now be made in detail to the present disclosure, examples of which are illustrated in the accompanying drawings.

Figure 1:
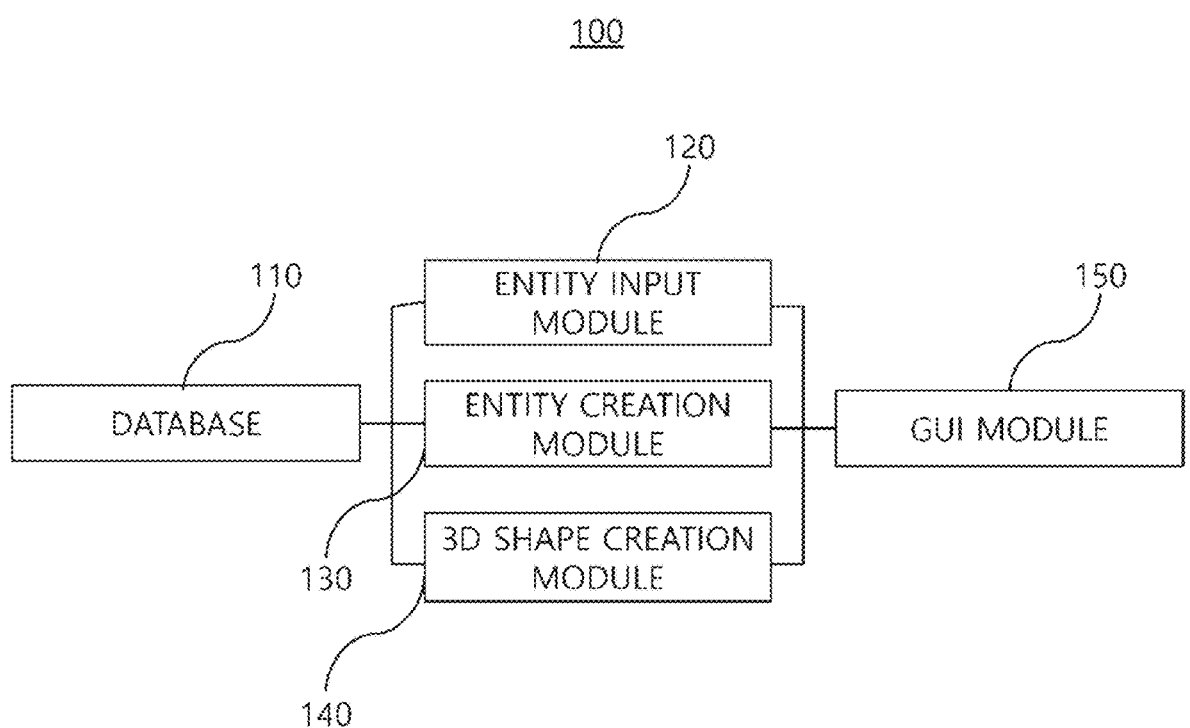
FIG. 1 is a schematic block diagram of a casting system design system according to an embodiment of the present disclosure.

FIG. 1 is a schematic block diagram of a casting system design system according to an embodiment of the present disclosure.

As shown in FIG. 1, a casting system design system 100 according to the present disclosure may include a database 110, an entity input module 120, an entity creation module 130, a 3D shape creation module 140, and a graphic user interface (GUI) module 150.

The database 110 may store knowledge-based design basic information. The knowledge-based design basic information may be accumulated data on how molten metal flows into the mold and solidifies based on various factors such as the stability of the molten metal, shrinkage of the molten metal depending on the shape of the mold, and possibility of mixing of gas.

That is, the accumulated data may be a knowledge base obtained by regularizing an empirical formula of an expert for designing an optimal casting system. The knowledge base may be obtained by extracting and regularizing the empirical formula for an optimal casting system design from optimal casting system design knowhow accumulated for many experiences of a casting system design expert and a large number of optimal casting system design data designed therefrom.

The data may provide an automatic design library that is a core function of the casting system design system as a knowledge base formed by integrating a casting analysis algorithm, analysis results based thereon, and casting expert knowledge.

The database 110 may make a numerical change of a design variable input by an operator and a shape of the design variable based on the numerical change into data.

The knowledge-based design basic information may also include information on a casting device to be used, that is, information on the position of an outlet from which molten metal is discharged, the shape and the size of a sleeve of an outlet, and the like.

Here, the sleeve may be a component that forms an outlet through which molten metal is discharged and may be a part in which the molten metal in the casting device is lastly stored before flowing into the casting system, and since the shape and the size of the sleeve are different for each casting device, information on the shape and the size of the sleeve is also required to design an optimal casting system.

The entity input module 120 may be a component for receiving a shape-related entity of casting. Here, the shape-related entity may refer to data on the size and the shape of a mold, a core, chill, etc.

The entity input module 120 may include a drive for reading shape data from a storage medium such as a CD or a DVD, a network interface to be connected to the Internet, a LAN, etc., and an input interface such as a keyboard or a mouse.

Here, the received shape-related entity of a mold may be 3D shape data and may also be provided in the form of graphic data that is data created by CAD, CAM, or other graphic tools.

An operation condition about a material of molten metal, an injection pressure or an injection speed of the molten metal, temperature of the molten metal, etc. may be received from an operator through the entity input module 120, and selection of information on any one of casting devices, stored in the database 110, may also be received.

Reception of the operation condition and selection on the casting device may be performed using a method of selecting one template on a preset template, and in this case, a template to which an operator simultaneously inputs information on the operation condition and the casting device may also be provided.

Information on an ingate, for example, the number of ingates, the position of each ingate, the shape, the width, and the thickness of each ingate, etc. may also be received through the entity input module 120, and in this case, the operator may set and input an ingate depending on the shape of a product to be cast.

The entity creation module 130 may be a component for creating an entity for each component of the casting system based on the knowledge-based design basic information pre-stored in the database 110 and the received shape-related entity.

The entity creation module 130 may analyze a design of a casting method by executing a casting process simulation by itself or through a connected simulation module (not shown) and may determine whether the simulation result satisfies a preset standard to set an optimal casting method. In this case, the casting method of a design changed according to an edit command of the operator may be repeatedly analyzed.

Here, an entity for each component of the casting system may include an entity for a pouring path, a path-line, an ingate, a joint, a branch riser, and a vent. Each entity will be described in detail with reference to FIGS. 3 to 7.

The 3D shape creation module 140 may create a 2D or 3D casting system model using the created entity for each component of the casting system.

The GUI module 150 may receive a user command and may display the result calculated by the entity creation module 130 and the 3D shape creation module 140.

That is, the GUI module may allow the entity creation module 130 to create the entity for each component of the casting system according to the user command and may display the 2D or 3D casting system modeled based on the entity created by the entity creation module 130 in the form of graphics.

The GUI module 150 may receive data changes such as the shape, the position, the size, etc. of each entity of the casting system, which are displayed on a screen, may allow the entity creation module 130 to reset each entity according to the changes, and may change and display the position, the size, etc.

Figure 2:
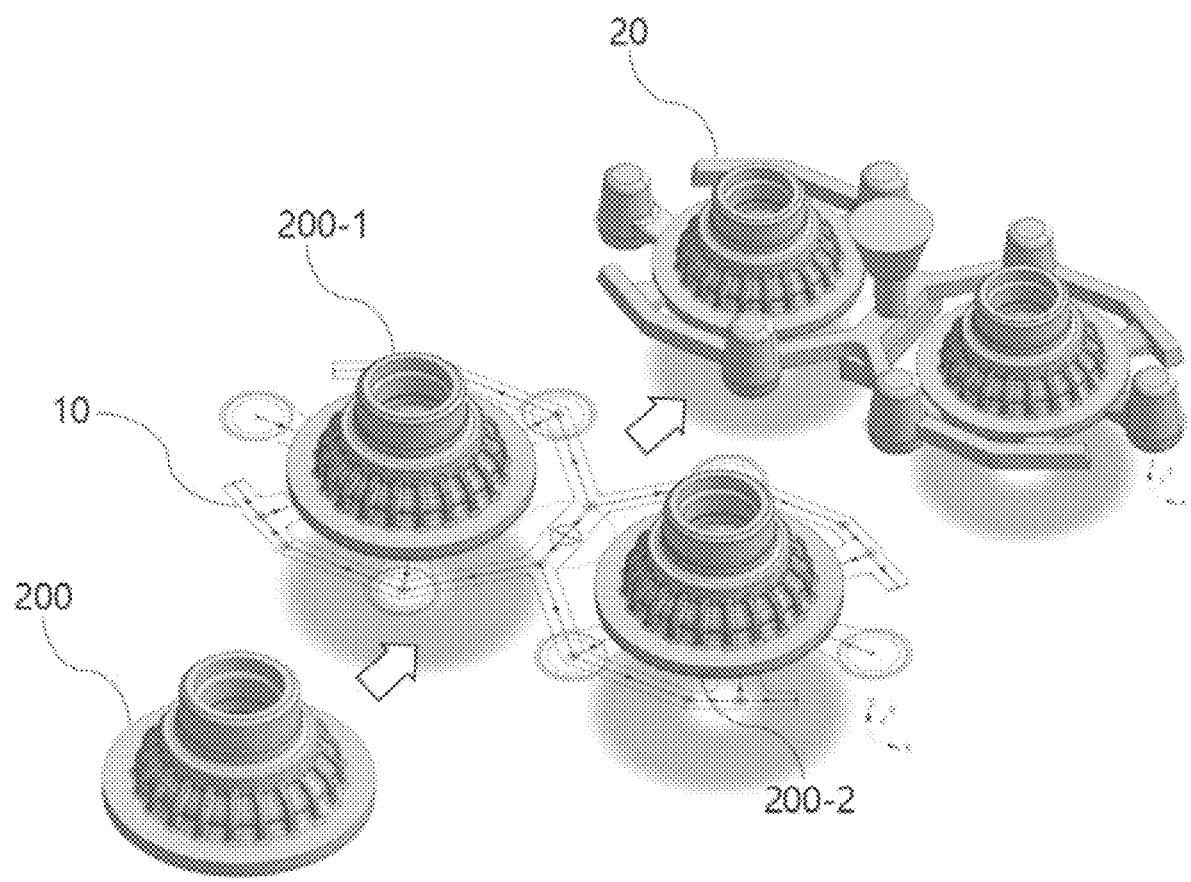
FIG. 2 is a schematic diagram of a procedure of designing a casting system according to an embodiment of the present disclosure.

FIG. 2 is a schematic diagram of a procedure of designing a casting system according to an embodiment of the present disclosure.

When a user inputs data created by CAD, CAM, or other graphic tools as the 3D shape data of a casting 200 to the casting system design system 100, the entity for each component of the casting system may be created based on the shape-related entity of the casting included in the input shape data and the knowledge-based design basic information stored in the database 110.

In this case, the system 100 may design the casting system based on the created entity for each component of the casting system and may display the casting system designed in 2D graphic to allow the user to verify and edit the designed casting system.

As shown in FIG. 2, the system 100 may design the optimal casting system and may automatically display the number of castings 200-1 and 200-2 and an arrangement method thereof in the corresponding casting system in a 2D graphic shape 10 through the GUI module 150.

When edit/verification of the designed casting system is completed, a 3D graphic shape 20 of a casting system 10 may be displayed.

Figure 3:
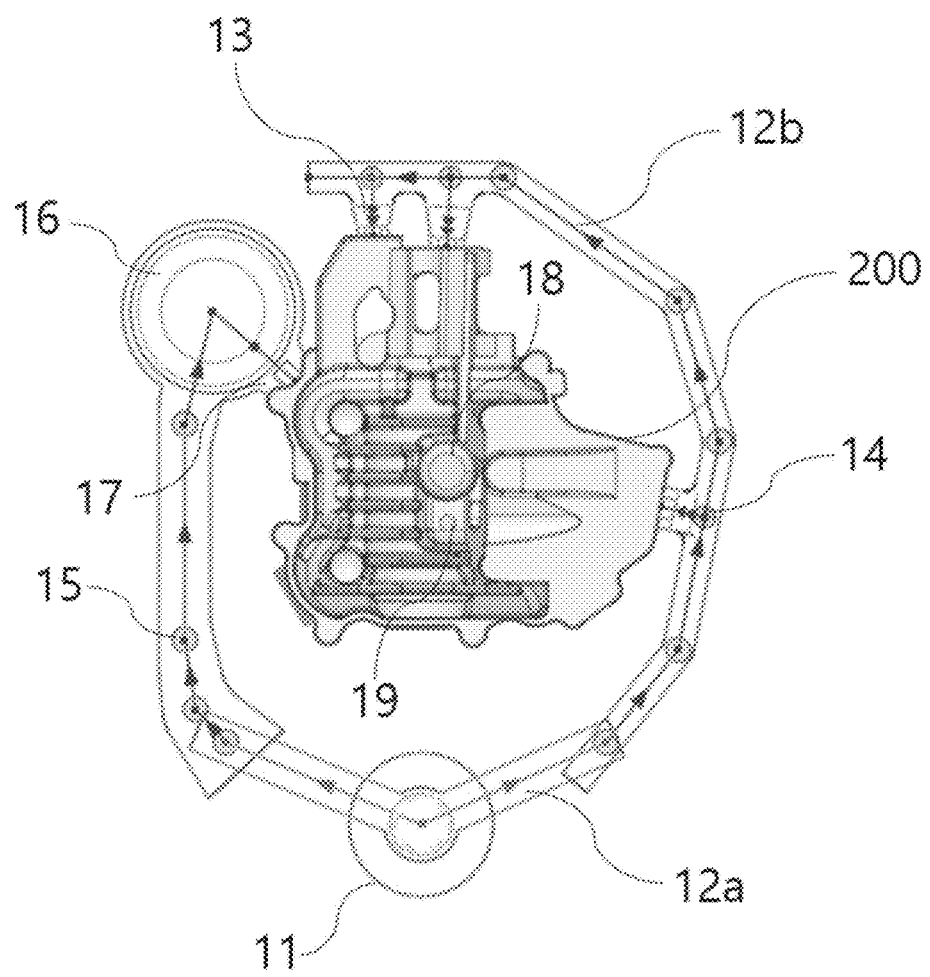
FIG. 3 is a diagram for explaining an entity for each component of a casting system according to an embodiment of the present disclosure.

FIG. 3 is a diagram for explaining an entity for each component of a casting system according to an embodiment of the present disclosure.

Entities configuring the casting system 10 may be largely classified into a runner part and a riser/vent part of the casting system.

An entity configuring the runner part may include a pouring path 11, path-lines 12a and 12b, an ingate 13, a branch 14, and a joint 15.

An entity configuring the riser/vent part may include a riser 16, a riser neck 17, a top rise 18, and a vent 19.

Hereinafter, the shape-related entity of the casting and the entity for each component shown in FIG. 3 will be described in detail with reference to FIGS. 4 to 7.

Figure 4:
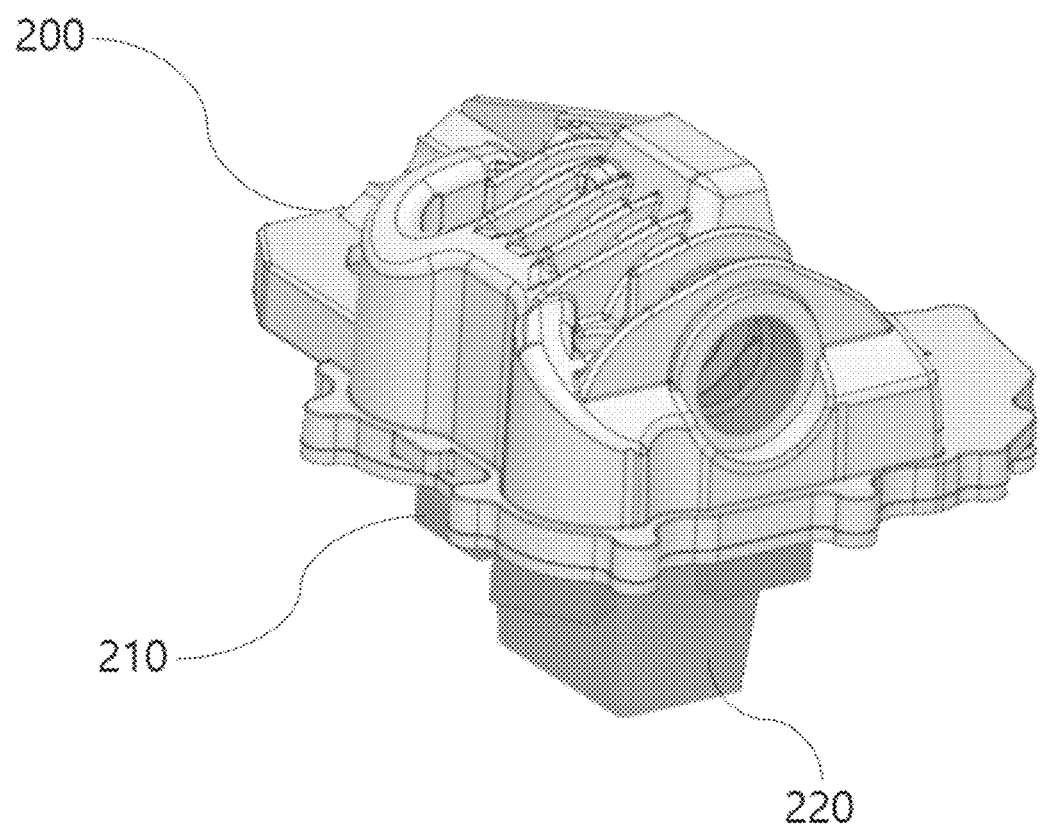
FIG. 4 is a diagram for explaining a shape-related entity of a mold according to an embodiment of the present disclosure.

FIG. 4 shows an example in which a shape-related entity of a mold is provided in the form of graphic data that is data created by CAD, and the shape-related entity may include an entity for the casting 200, an entity for a chill 210, and an entity for a core 220.

The entity creation module 130 may extract the aforementioned entities from the received CAD data and may create the entity for each component of the casting system based on the extracted entity.

Figure 5:
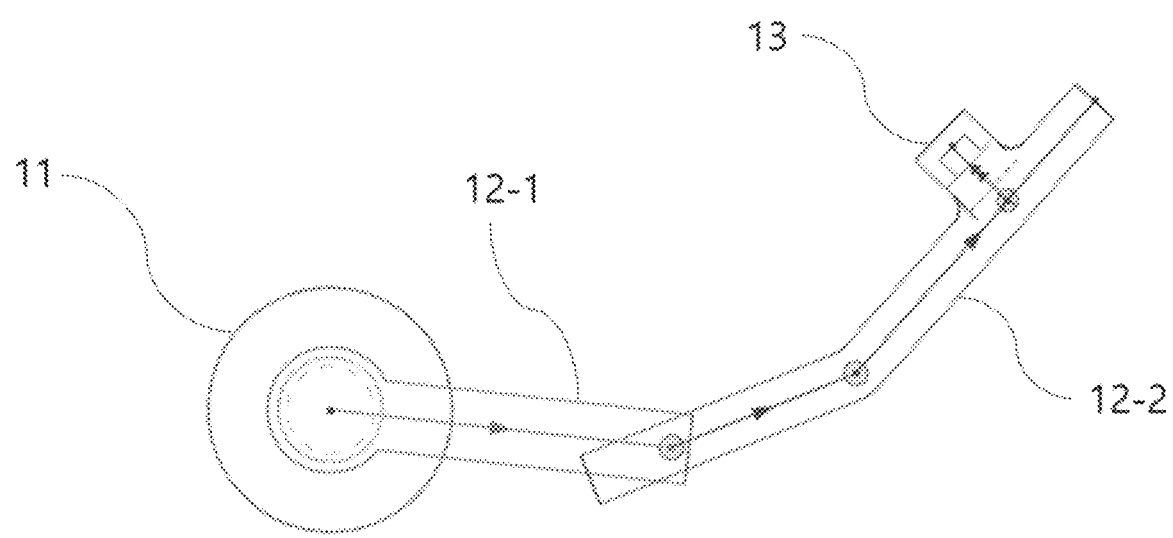
FIGS. 5 and 6 are diagrams for explaining an entity for each component of a runner part of a casting system according to an embodiment of the present disclosure.
Figure 6:
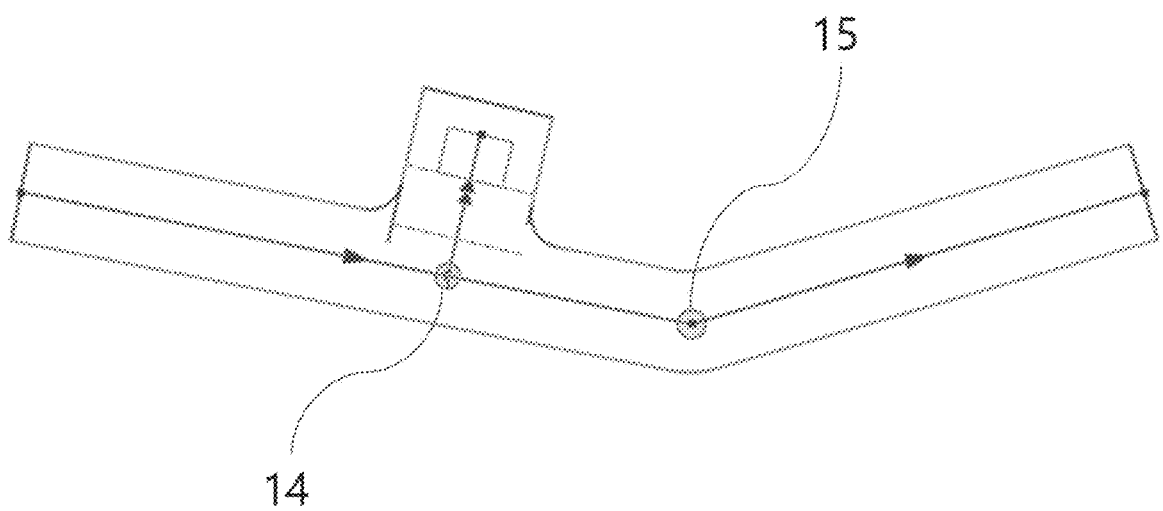

FIGS. 5 and 6 are diagrams for explaining an entity for each component of a runner part of a casting system according to an embodiment of the present disclosure.

A runner may be a component configuring a path for allowing molten metal flowing into the casting system to flow into a mold having a shape of a product.

In this case, as shown in FIG. 5, the runner may include a pouring path 11 through which molten metal flows into a mold, path-lines 12-1 and 12-2, and the ingate 13 as an inlet through which molten metal flows into a mold. Here, the path-lines 12-1 and 12-2 may include a drag part 12-1 and a cope part 12-2 that are separated by a parting line.

The above entity for each component of the runner part of the casting system may be used as information for creating 3D shapes of a pouring path and a path-line and may include information on the pouring path, the width, the length, and the height of one end and the other end of the path-line, the height of an ingate, and the length, the draft angle, and the curvature of the ingate.

As shown in FIG. 6, the runner may include a branch 14 for rapidly injecting molten metal into a thin casting, and a joint 15 as a point at which a movement path of molten metal is bent or diverged.

The entity for each component of the runner part of the casting system may be used to create a 3D shape of the joint 15, etc. and may include information on the number of path-lines connected to a joint, the width of the path-line, a curvature depending on a connection angle between the path-lines, etc.

Figure 7:
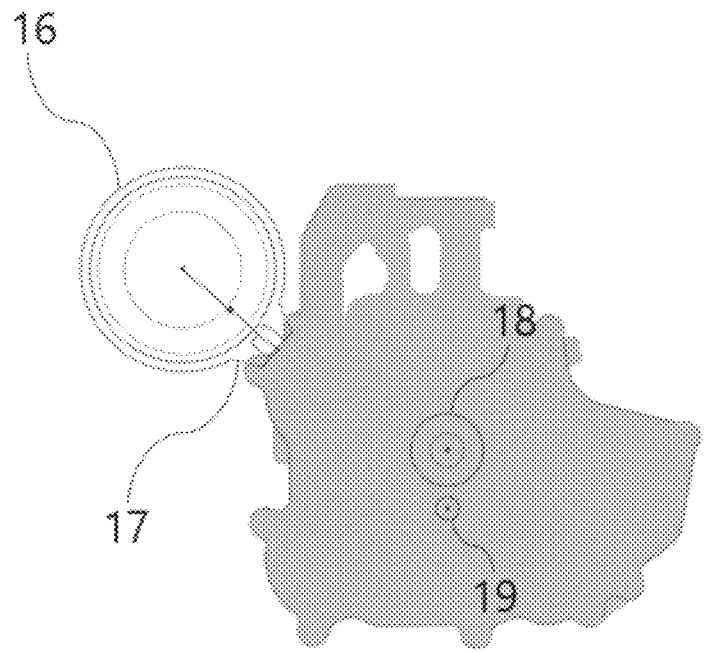
FIG. 7 is a diagram for explaining an entity for each component of a riser/vent part of a casting system according to an embodiment of the present disclosure.
Figure 7:
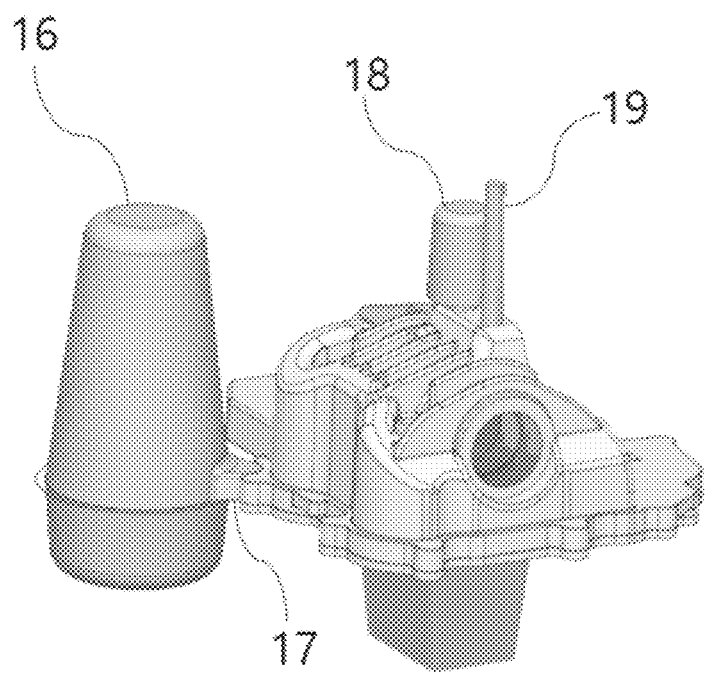

FIG. 7 is a diagram for explaining an entity for each component of a riser/vent part of a casting system according to an embodiment of the present disclosure.

As shown in FIG. 7, the riser may include a side riser 16 placed horizontally next to a mold cavity, and a top riser 18 formed above a casting.

In general, when the molten metal is cooled in a mold, the volume of molten metal decreases as the molten metal solidifies and shrinks. A main function of the risers 16 and 18 may be to compensate for lack of molten metal due to solidification and shrinkage by supplying molten metal until the end of the casting solidification.

The risers 16 and 18 may be separate molten metal reservoirs that achieve the above purpose by supplying insufficient molten metal due to shrinkage, and thus needs to be designed at an appropriate position.

Lack of molten metal due to solidification and shrinkage is most likely to occur in a hot spot in which solidification occurs relatively late in the mold, and thus the riser needs to be placed adjacent to the hot spot.

Thus, the entity creation module 130 may determine the hot spot of the casting according to a preset standard based on the knowledge-based design basic information pre-stored in the database 110 and the shape-related entity input through the entity input module 120 and may place the risers 16 and 18 adjacent to the determined hot spot.

For example, the entity creation module 130 may determine three hot spots in an order in which the thickness of the casting is expected to be greatest based on information on the thickness of the casting and may place a riser at a middle point of the determined hot spots. That is, the position of the riser, which is determined based on the thickness of the casting, may be applied to an entity of the riser.

Alternatively, in a graphic shape simulated and displayed in 2D or 3D, an operator may determine a position at which the riser is to be placed and may directly plate the riser on a GUI.

The knowledge-based design basic information including each component of the casting system and an optimization algorithm required for a casting design may be stored in the database 110, and the entity creation module 130 may create the entity for each component of the casting system based on the stored design basic information and the optimization algorithm.

Figure 8:
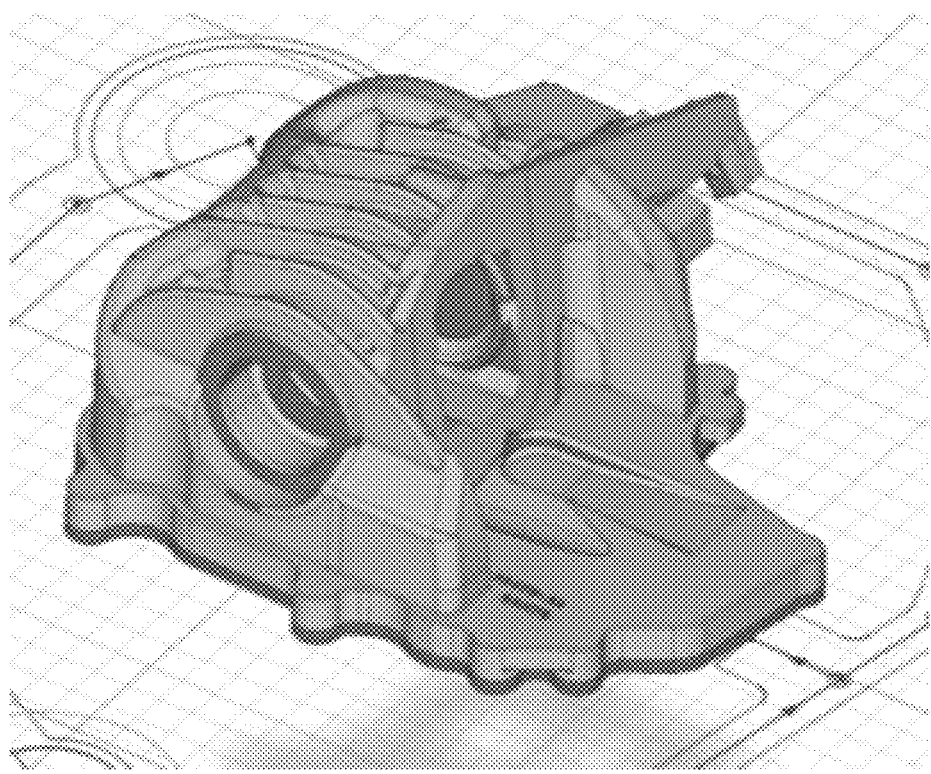
FIGS. 8 and 9 are diagrams for explaining a method of checking and analyzing the soundness of a casting system according to an embodiment of the present disclosure.
Figure 9:
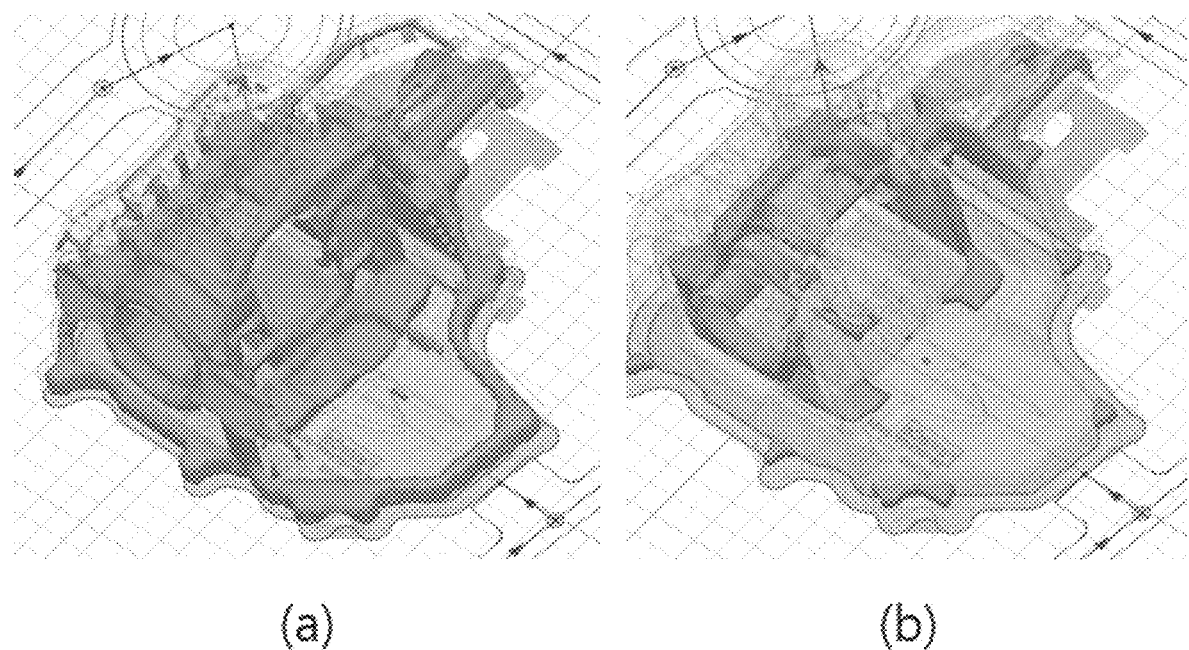

FIGS. 8 and 9 are diagrams for explaining a method of checking and analyzing the soundness of a casting system according to an embodiment of the present disclosure.

As shown in FIG. 8, the 3D shape creation module 140 may create a 3D graphic shape of the casting system designed based on the entity created by the entity creation module 130 and may display the 3D graphic shape.

In particular, as shown in FIG. 9, a casting procedure via injection of molten metal according to user input may be virtually simulated through a simulation module included in or connected to the system 100.

Thus, the operator may conveniently check soundness including 10 or more factors such as a draft angle and hot spot analysis of a product or a core and may check the results immediately.

Figure 10:
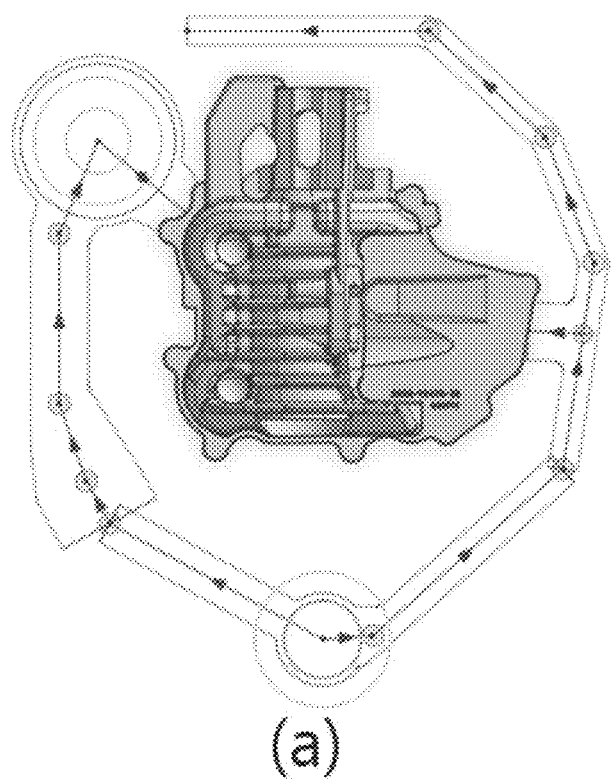
FIGS. 10 to 12 are diagrams for explaining simulation of a casting system according to various embodiments of the present disclosure.
Figure 10:
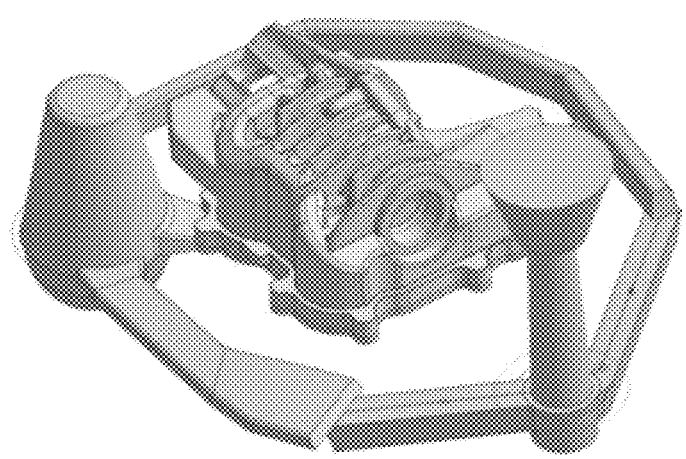
Figure 11:
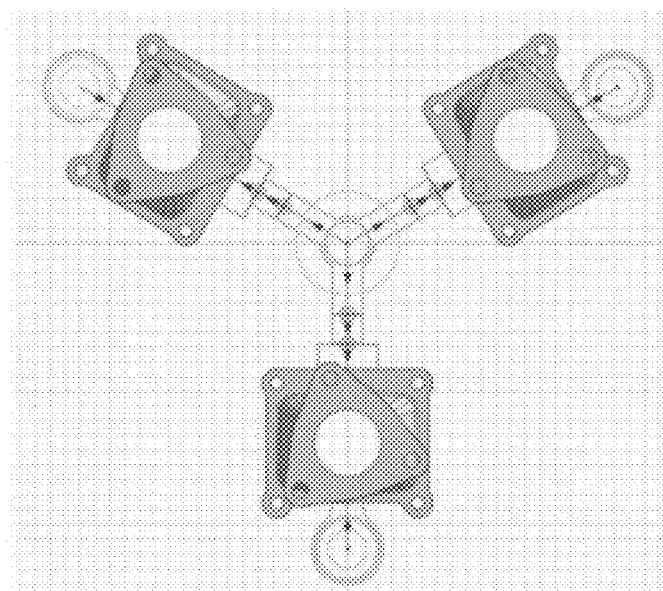
Figure 11:
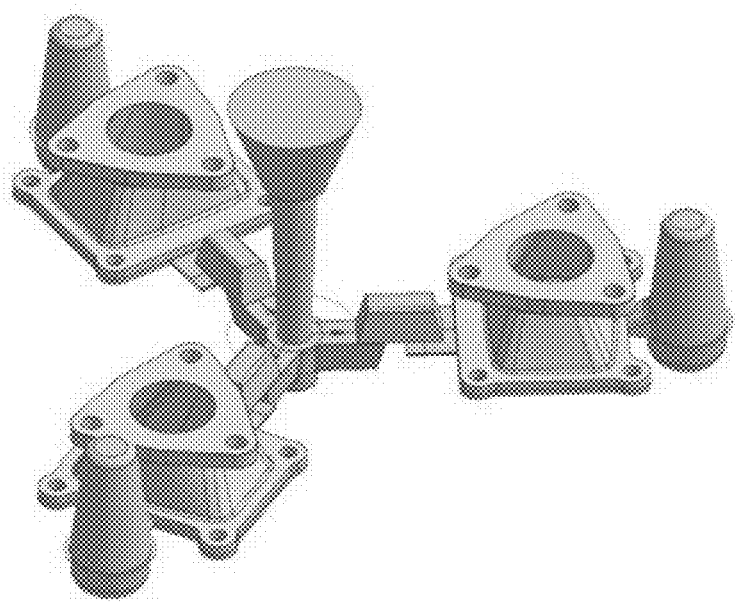
Figure 12:
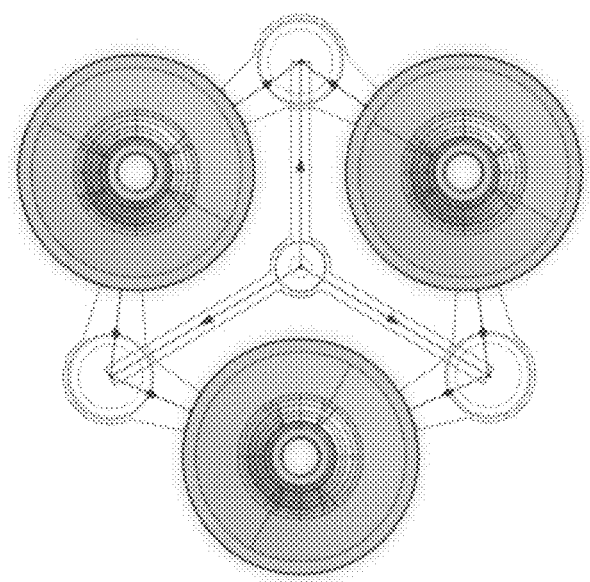
Figure 12:
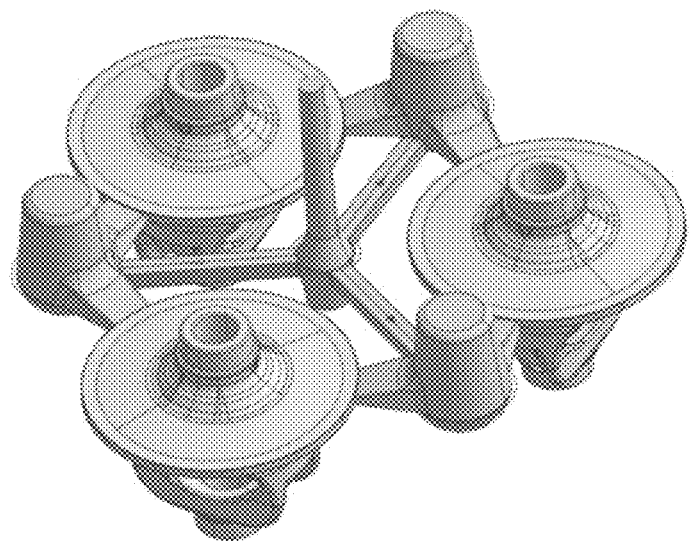

FIGS. 10 to 12 are diagrams for explaining simulation of a casting system according to various embodiments of the present disclosure.

FIGS. 10A and 12A show a casting system designed in a 2D graphic shape based on an entity for each component of a casting system analyzed and created depending on a shape of a casting. Viewing such an image, an operator may edit a design of the casting system.

FIGS. 10B and 12B show an image of a 3D graphic shape of a casting system, which is lastly created and displayed. Viewing the image, the operator may perform casting simulation and soundness check.

Figure 13:
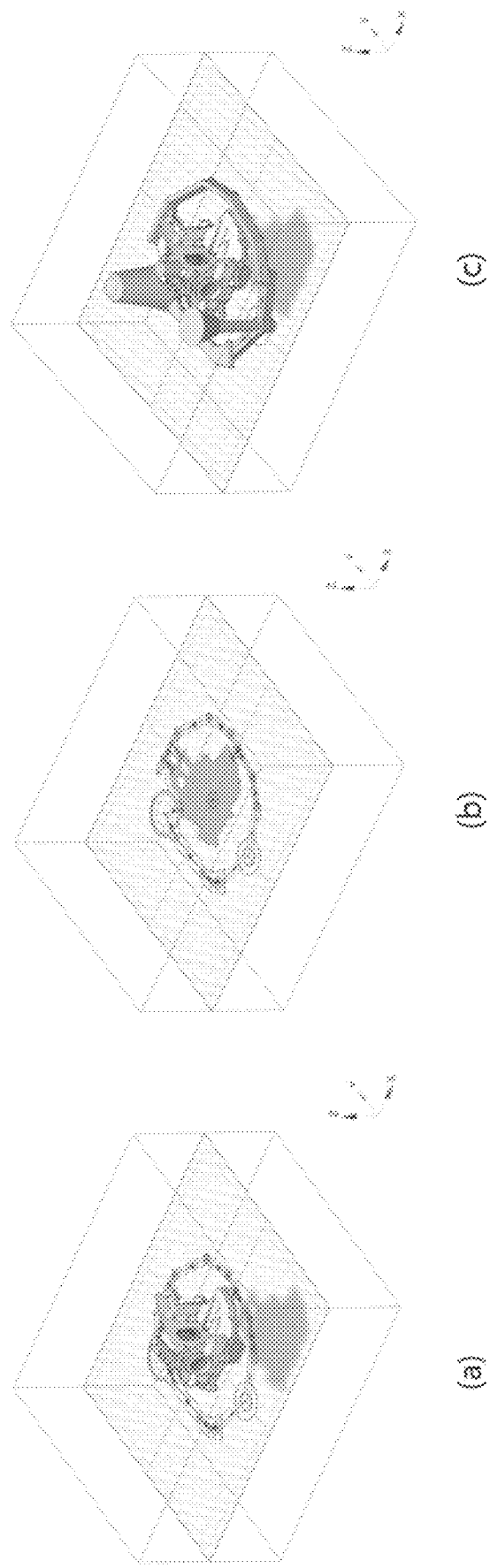
FIG. 13 is a diagram showing the state in which a 2D casting system is modeled in a 3D shape on a GUI according to an embodiment of the present disclosure.

FIG. 13 is a diagram showing the state in which a 2D casting system is modeled in a 3D shape on a GUI according to an embodiment of the present disclosure.

When an entity related to the shape of a casting, for example, CAD data is input, the entity creation module 130 may design the casting system based on the input CAD data. The casting system may be displayed in 2D graphic as shown in FIG. 13A.

Here, the 2D casting system may correspond to a cross section of the 3D casting system.

As shown in FIG. 13B, a shape of a casting input as CAD data may also be displayed in 2D graphic. In this case, whether a design of casting system design is optimized may be intuitively recognized compared with the case in which the shape of a casting or the designed casting system is displayed in 3D graphic.

For example, the cross section of the casting system is displayed on a GUI, and thus the operator may easily determine the shape of a casting, a hot spot, etc. or may easily determine the position, the shape, the size, and the arrangement of ingates.

As shown in FIG. 13C, when the operator completely edits the design of the casting system, the 3D shape creation module 140 may create and display the 3D graphic shape of the casting system. In this case, the operator may analyze and check inflow and solidification of molten metal, a draft angle, and the like through simulation.

Figure 14:
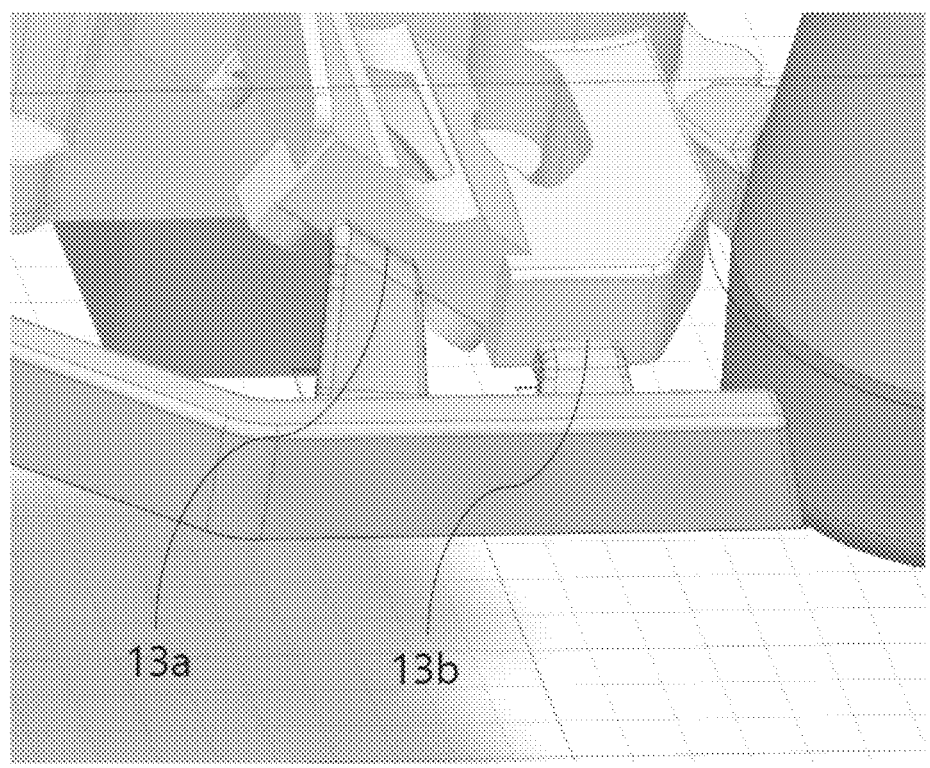
FIG. 14 is a diagram for explaining an example in which the height of an ingate is adjusted and a casting system is designed according to an embodiment of the present disclosure.

FIG. 14 is a diagram for explaining an example in which the height of an ingate is adjusted and a casting system is designed according to an embodiment of the present disclosure.

As shown in FIG. 14, ingates 13a and 13b of the casting system may be placed at different heights depending on an optimal position based on the shape of a casting rather than being uniformly placed on the same plane. Conventionally, it may be difficult for an operator to determine or adjust the height of an ingate.

According to an embodiment of the present disclosure, when the operator inputs an edit command for an ingate using a method of clicking and dragging/dropping the ingate in a design of a casting system designed in 2D on a GUI, the height of the ingate may also be automatically changed to match the height of a mold corresponding to the position at which the ingate is moved.

Thus, the operator may conveniently adjust and simulate a 3D position of the ingate without needing to manually adjust the height of the ingate.

FIG. 15 is a flowchart for explaining a method of designing a casting system according to an embodiment of the present disclosure.

First, a shape-related entity of a casting may be input (S1210).

Then, an entity for each component of a casting system may be created based on the input shape-related entity and pre-stored knowledge-based design basic information (S1220). In this case, an entity for a first part including a pouring path, a path-line, an ingate, a joint, and a branch of the casting system, and an entity for a second part including a riser or a vent may be created. The riser may be a cavity having an internal space equal to or greater than a preset volume, and the position and number of the casting system in a flow path may be determined based on the shape of the mold.

Then, a 3D graphic shape of the casting system designed based on the created entity may be created (S1230).

Then, the design of the casting system may be edited according to the input edit command on a GUI on which a 2D graphic shape corresponding to the created 3D graphic shape is displayed, may dynamically modify a 2D graphic shape to correspond to the editing, and may display the modified shape (S1240). In this case, the height of the ingate in the shape of a flow path may be automatically adjusted to edit the design of the casting system depending on the position of the ingate, which is changed according to the edit command.

As described above, the design method or the system control method according to an embodiment of the present disclosure may be programmed and stored in various storage media. Accordingly, the methods according to the aforementioned various embodiments may be implemented in various types of processors executing the storage medium.

In addition, the aforementioned design method may be implemented as a program including an executable algorithm to be executed in a processor, and the program may be stored in a non-transitory computer readable medium and may be provided.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disk (CD), a digital versatile disk (DVD), a hard disk, a Blu-ray disk, a universal serial bus (USB), a memory card, a read only memory (ROM), and the like, and may be provided.

The above description of the present disclosure is for illustration, and those of ordinary skill in the art to which the present disclosure pertains may understand that it may be easily modified into other specific forms without changing the technical spirit or essential features of the present disclosure. Accordingly, it should be understood that the embodiments described above are illustrative in all respects and not restrictive. For example, each component described as a single type may be implemented in a distributed manner, and similarly, components described as distributed may also be implemented in a combined form.

The scope of the present disclosure is indicated by the following claims rather than the above detailed description, and all changes or modifications derived from the meaning and scope of the claims and their equivalents should be interpreted as being included in the scope of the present disclosure.

The invention claimed is:

1. A design system of a casting system, the design system comprising a processor configured to:

store knowledge-based design basic information;

receive a shape-related entity of a casting, a casting system of which is to be designed;

create an entity for each component of the casting system based on the received shape-related entity and knowledge-based design basic information pre-stored in the processor;

create a 3D graphic shape of the casting system designed based on the received shape-related entity of the casting and the created entity for each component of the casting system; and edit a design of the casting system according to a received edit command on a graphic user interface (GUI) on which a 2D graphic shape corresponding to the created 3D graphic shape is displayed, to dynamically modify the 2D graphic shape to correspond to the editing, and to display the modified 2D graphic shape, wherein the shape-related entity of the casting includes a size and shape of the casting, a core, and a chill, wherein the entity for each component of the casting system includes a first part entity including a pouring path, a path-line, an ingate, a joint, and a branch and a second part entity including a riser and a vent, wherein, for editing a position of the ingate on a GUI on which the 2D graphic shape corresponding to the created 3D shape is displayed, the processor automatically adjusts a height of the ingate in a shape of a flow path to match a height of a mold corresponding to a position at which the ingate is moved and displays an adjustment result according to an edit command of clicking and dragging/dropping the ingate.

2. The design system of claim 1, wherein an entity for the riser of the second part entity includes a side riser, top riser and riser neck.

3. The design system of claim 1, wherein the processor determines a position of the riser based on a thickness of the casting and applies the determined position of the riser to an entity of the riser.

4. The design system of claim 1, wherein the processor is further configured to:

perform simulation for checking soundness of the designed casting system depending on injection of molten metal according to a user command.

* * * * *